No. 817,258. PATENTED APR. 10, 1906.
O. G. A. LITTMANN.
MOTOR DRIVEN VEHICLE.
APPLICATION FILED MAR. 1, 1904.
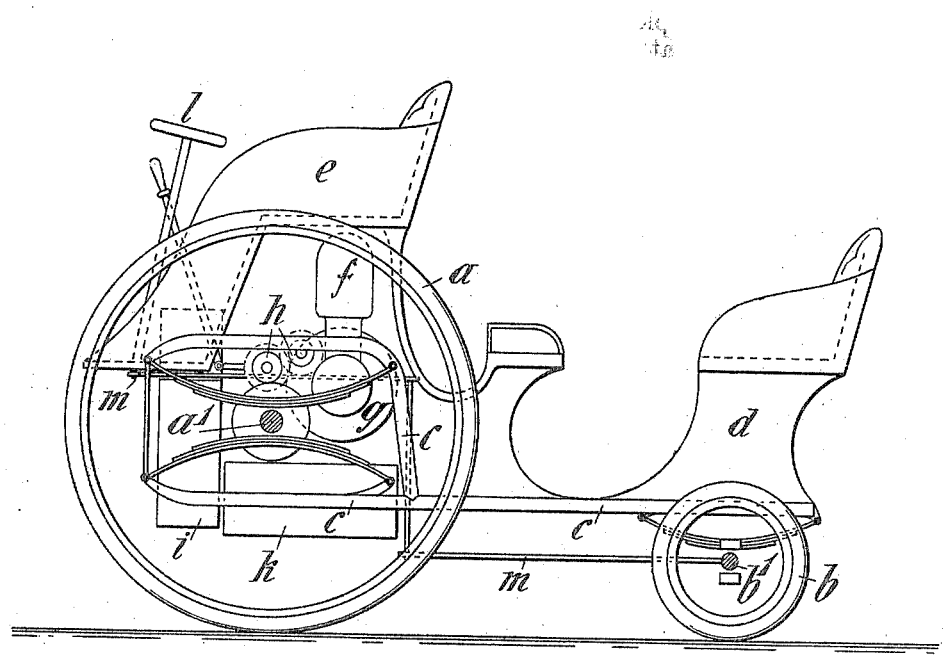
Witnesses:
Inventor:
Otto Gustav Adolf Littmann
ATTORNEYS

UNITED STATES PATENT OFFICE.

OTTO GUSTAV ADOLF LITTMANN, OF CHARLOTTENBURG, GERMANY.

MOTOR-DRIVEN VEHICLE.

No. 817,258.          Specification of Letters Patent.          Patented April 10, 1906.

Application filed March 1, 1904. Serial No. 196,001.

*To all whom it may concern:*

Be it known that I, OTTO GUSTAV ADOLF LITTMANN, a subject of the King of Prussia, German Emperor, residing at Charlottenburg, near Berlin, in the Kingdom of Prussia, German Empire, have invented certain new and useful Improvements in Motor-Driven Vehicles; and I do hereby declare the following to be a full, clear, and exact description of the invention, such as will enable others skilled in the art to which it appertains to make and use the same.

This invention relates to an improved arrangement or construction of motor-driven vehicles.

The improvements consist, substantially, in that the whole of the means for driving or propelling and braking the vehicle and the like are arranged on the front wheels and their axle or act upon said axle, while the steering of the vehicle is effected by means of the hind wheels. The front axle is made of sufficient strength and the front wheels of a sufficient size for this purpose, while the hind wheels can be made as low as required by the construction and purpose of the vehicle.

The fundamental idea of the invention thus consists in the arrangement of large front driving-wheels and small rear steering-wheels. This arrangement is essentially different from that heretofore usual in motor-driven vehicles wherein the steering has as a rule been effected by means of the front wheels, while the four wheels have been of equal or approximately equal size. Motor-vehicles have already been constructed with large driving and small steering wheels; but the small steering-wheels have, as usual, been located in front of the vehicle. Vehicles have also in exceptional instances been adapted to be steered by means of their rear wheels. In these cases four large wheels of equal size have always been used.

It becomes practicable in a vehicle constructed in accordance with this invention to arrange between the front wheels the whole of the means for driving or propelling and braking the vehicle and the like. The vehicle will then be drawn after the manner of a horse-drawn vehicle by the tractive force of its front driving-wheels instead of being pushed, as in existing constructions, by means of rear driving-wheels. In consequence of this and of the relative sizes of the wheels the advantages hereinafter set forth are attained.

A motor-driven vehicle or automobile constructed according to this invention is shown by way of example in the accompanying drawing in combination with a benzin-motor, it being of course obvious that any other motor—such as a gas, steam, or electric motor—may be also employed. The shape and arrangement of the vehicle-body and of the driver's seat shown in the drawing are not material, and it is obvious that the car-body, and therefore also the driver's seat, may be made of any desired external shape and may also be provided with a roof or cover, so that the vehicle can be built for the most varied uses—such as, for example, a sporting-car, cab, private carriage, landau, omnibus, goods-wagon, &c.

In the drawing well-known parts—such as the spokes of the wheels, the axle-bearings, and such like subsidiary parts—have been omitted for the purpose of enabling the essential parts of the invention to be better illustrated. The drawing is therefore to be considered as a diagrammatic drawing.

In the motor-vehicle shown in the drawing, the front wheels $a$ are of relatively very large diameter, while the hind wheels $b$ are of relatively small diameter. The axles $a'$ and $b'$ of these two pairs of wheels carry the suitably-constructed underframe $c$, on which latter the car-body $d$, with the driver's seat $e$, rests. This driver's seat $e$ is located immediately over the front axle $a'$ and is therefore specially elevated. It could be made to fold or turn over or be removable for the purpose of allowing an easy access to the driving parts which are located under the driver's seat on the underframe or act upon the axle $a'$. These driving parts are shown in the drawing in outline only, $f$ being the cylinder, and $g$ the fly-wheel casing of the motor which serves to drive the axle $a'$, either directly or through the medium of gearing $h$, for changing the speed and power ratio. The levers for starting, speed-changing, or reversing and for causing the brake to act in a suitable manner on the axle $a'$ may be arranged without difficulty on the driver's seat or in a convenient position to be operated therefrom. Further, the drawing shows the water vessel $i$ with cooling device and a benzin-tank $k$ located between the wheels $a$.

The steering of the vehicle is effected by operating the hind wheels $b$, which, as has hitherto been usual in the case of the front wheels of motor-cars, are pivoted in arms or forks. The means for operating the wheels $b$ from the steering-wheel *l* consist of suitably-arranged rodding *m m*.

Motor-vehicles constructed according to this new arrangement have the following important advantages:

First. The driver's seat, which is now located directly over the driving parts, is situated at such a height as to enable the driver to have a free view in every direction forward and backward without trouble. This is of particular importance in heavy traffic in narrow places more especially, because motor-vehicles must move not only forward, but also backward, and therefore it is very important that the driver should have a free outlook backward over the car as he has forward. In the case of horse-drawn vehicles this is not necessary, and in such cases the location of the driver's seat or box at a great elevation is only an expedient to enable the front wheels to pass under the vehicle-body in turning round. Further, the arrangement of the driver's seat directly over the motor and in close proximity to the driving-wheels simplifies the transmission of the power.

Second. The large wheels on the high driving-axle can acquire a higher speed with slower revolution so that the tires and tire-covers are less subject to wear and tear. Further, as the main load is carried by the front wheels the vehicle will not be so liable to jump and lurch about on uneven, smooth, or slippery roads, so that the vehicle will therefore run more smoothly. This is very important for safety in traveling because the large wheels which also support the greatest load of the vehicle—namely, the engine—have a greater friction, and therefore a greater tractive force, so that they can give a higher speed of travel with a moderate speed of revolution. Wheels revolving at a high speed are very liable to slip and are wanting in braking power when desired to stop.

Third. If the vehicle-body be constructed in the form of a cab, landau, or the like, the entire vehicle is rendered shorter, and thereby more handy and convenient and especially suitable for use in large towns. The vehicle-body itself, especially in the case of wagons, carts, and street-omnibuses, may be arranged as low as desired, because the hind wheels can be made as small as desired.

Fourth. The steering by means of the hind wheels is more exact and more rapid than by means of the front wheels, because it is easy to give the smaller hind wheels any desired turning angle, which was not the case with the front wheels of the motor-vehicles hitherto employed. Further, the actual weight of the vehicle—that is to say, the vehicle-body—rests upon the hind wheels which serve for steering the vehicle, whereby the safety and reliability of the steering is increased—namely, the steering-wheels which have been hitherto employed and located at the front part of the vehicle and have been loaded to a smaller extent are very liable to be diverted on slippery roads or by unevenness of the track without the person holding the steering-wheel of the vehicle being able to remedy the wrong movement of the steering-wheels in the short time available for that purpose. Now this wrong movement of the steering-wheel thus accidentally produced has hitherto caused the most accidents which have occurred, especially when traveling at a high speed.

Fifth. By arranging the motor and the driving parts above and below the front axle it is possible to make the vehicle—that is to say, the entire motor-vehicle—shorter than in the types of construction hitherto employed, wherein by reason of the low front wheels all the parts had to be arranged above the axle, and therefore behind one another. This is specially the case in heavy wagons, omnibuses, hackney-carriages, and the like.

Sixth. The system of construction herein described will deprive motor-vehicles of a great part of their danger, and, further, it is easy to provide a suitable catching or life-saving device in front of the vehicle.

What I claim is—

In a motor-driven vehicle, the combination of two relatively large front driving-wheels, two hind steering-wheels of small size relatively to said front wheels, an elevated axle for the front wheels serving as a driving and braking axle for the vehicle, a motor located between the front wheels, gearing between the motor and the driving-axle of the vehicle, a water-receptacle located between the front wheels with cooling arrangement for the motor, a store-receptacle located between the front wheels and below the front axle, a car-body over the rear axle, a driver's seat located over the front-wheel axle and above the plane of the car-body, and means for operating the small hind wheels from the driver's seat.

In witness whereof I have hereunto signed my name this 17th day of February, 1904, in the presence of two subscribing witnesses.

OTTO GUSTAV ADOLF LITTMANN.

Witnesses:
MAXIMILIAN QUIGLY,
WALDEMAR BROCK.